Feb. 6, 1951 G. E. SHAFER 2,540,141
LONGITUDINAL SEAM FOR CORRUGATED METAL PIPE
FOR LIGHT DUTY TUNNEL LINERS
Filed March 6, 1946

INVENTOR.
GEORGE E. SHAFER.
BY
Allen & Allen
ATTORNEYS.

Patented Feb. 6, 1951

2,540,141

UNITED STATES PATENT OFFICE 2,540,141

LONGITUDINAL SEAM FOR CORRUGATED METAL PIPE FOR LIGHT DUTY TUNNEL LINERS

George E. Shafer, Middletown, Ohio, assignor to Armco Steel Corporation, a corporation of Ohio Application March 6, 1946, Serial No. 652,293

6 Claims. (Cl. 138—75)

This invention relates to tunnel liners and more particularly to light duty tunnel liners. It will be clear, of course, that the invention could be applied to corrugated metal pipe for various uses, but it will be found most useful in connection with such light duty tunnel liners.

In the practice of cutting openings through existing embankments or under ground by the tunnel method some type of lining must always be provided so that the excavation will hold its shape. Such lining may be of a temporary nature to hold the shape of the excavation until a permanent lining can be installed or it may be a permanent lining in the first instance. The first tunnel linings were usually made of timber in the form of ring sets with sheeting between the rings to hold the earth. In very large tunnels, such as subways and the like, cast iron segmental linings are used, and these are bolted in place as the excavation is made. In recent years particularly in connection with smaller tunnels, pressed metal sections have been used and bolted in place. In all of these linings the excavation is made no larger than necessary to accommodate the lining.

Cast iron linings have generally been used for openings 20 feet in diameter and larger and pressed metal linings have been found advantageous for openings from 10 to 20 feet. An object of the present invention is to provide a liner which will be economical in sizes running from 10 feet in diameter to the smaller sizes where considerably less strength is required, which strength can be obtained by the use of corrugated metal.

Corrugated metal in the conventional form cannot be assembled inside an excavation and it is, therefore, another object of my invention to provide for a construction whereby the liner can be assembled from the inside. It is true that other constructions may be used if the excavation is made larger than necessary but this is bad practice because of the increased cost of the extra excavation and then the space between the liner and the over-excavated earth must be filled in so as to prevent initial movement.

Further objects of my invention include the provision of a structure which will be very inexpensive to manufacture and very easy to assemble and which will yet provide a strong and durable tunnel lining.

These and other objects of my invention which will appear hereafter I accomplish by that construction and arrangement of parts of which I shall now describe exemplary embodiments.

Reference is made to the drawings forming a part hereof and in which

Figure 5:
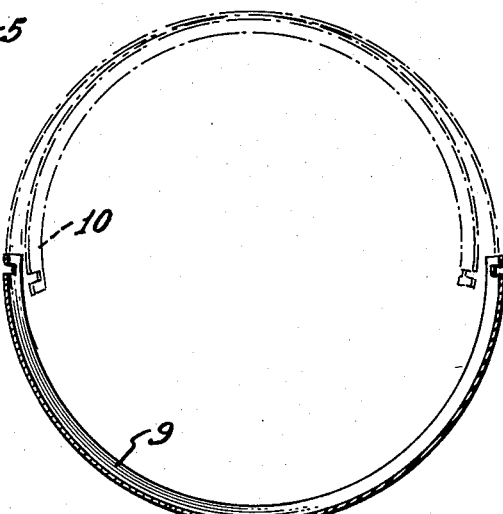
Figure 5 is a cross-sectional view on the line 5, 5 of Figure 4 showing in broken lines how a succeeding curved plate may be brought into position from within the tunnel.

Briefly in the practice of my invention I form my tunnel liner of a succession of ring-like sections which I fasten together end to end to form the complete liner. The individual ring-like sections are made up of a number of curved plates preferably corrugated as shown. For simplification of illustration I have shown in the drawings the construction in which a ring-like section is made up of two curved plates. While this construction is actually feasible as will be clear from a consideration of Figure 5 I prefer that the ring-like section be made up of at least three curved plates, thereby it is much easier to bring additional segments into the tunnel and it is unnecessary to spring them out of shape as shown in Figure 5.

Figure 1:
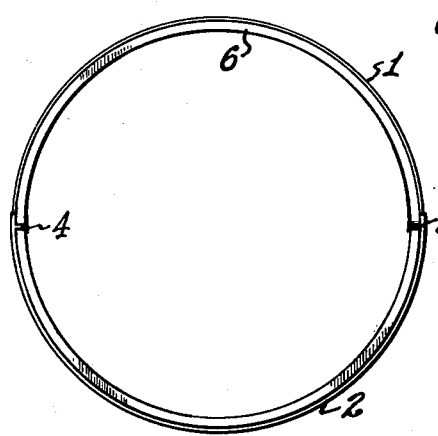
Figure 1 is an elevational view with parts in section of a ring-like section of tunnel lining according to my invention.
Figure 2:
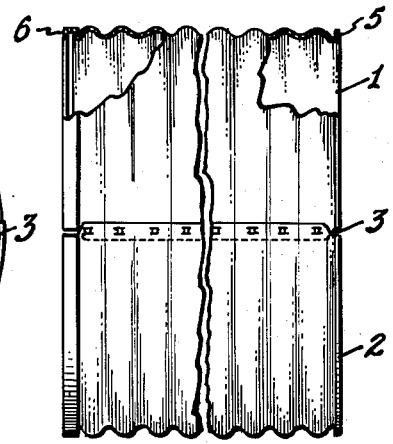
Figure 2 is an end elevational view of the same taken from the left of Figure 1.
Figure 3:
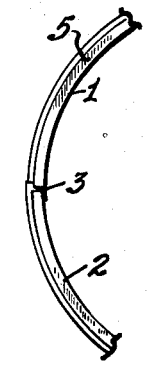
Figure 3 is a partial end elevational view of the same taken from the right of Figure 1.

In Figure 1 I have shown a ring-like section made up of the curved plates 1 and 2. The two plates are fastened together by means of two longitudinal seams as at 3 and 4 which seams will be described in more detail hereinafter.

For the purpose of fastening two ring-like sections end to end I have illustrated in Figures 1 to 6 inclusive an outwardly extending flange 5 at one end and an inwardly directed channel element 6 in the other end. I prefer to make the channel element 6 from a separate piece of material and weld it to the end of the plate section, although it will be clear that the member 6 could be an integral part of the member 1.

It will be clear that adjacent ring-like sections fit together with the flange elements 5 of one ring-like section entering the channel element 6 of an adjacent section.

The flange 5 could, of course, be made to extend inwardly and the channel element 6 to extend outwardly if desired. However, I prefer the construction shown for the reason that it is easier to form an outwardly extending flange than one extending inwardly; and also by extending the flange outwardly I avoid a sharp edge extending inwardly which could be injurious to a workman inside the pipe. The channel elements 6 in practice will be the same length as the curved corrugated section less one-half the width of the seam, so that as additional portions of the liner are brought into position and pushed outwardly into the channel elements, the completed ring will be held securely in position against movement in any direction.

Figure 6:
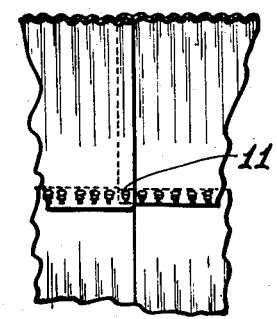
Figure 6 is an enlarged perspective view of one end of a curved plate.

Coming now to the longitudinal seam, I provide adjacent the longitudinal edges of the curved plate sections a series of hasp-like elements 7 which are most clearly shown in Figure 6. In effect I reverse the curvature of the corrugations in each valley by means of the struck up portions 7 to form a bi-convex opening 7a.

Figure 4:
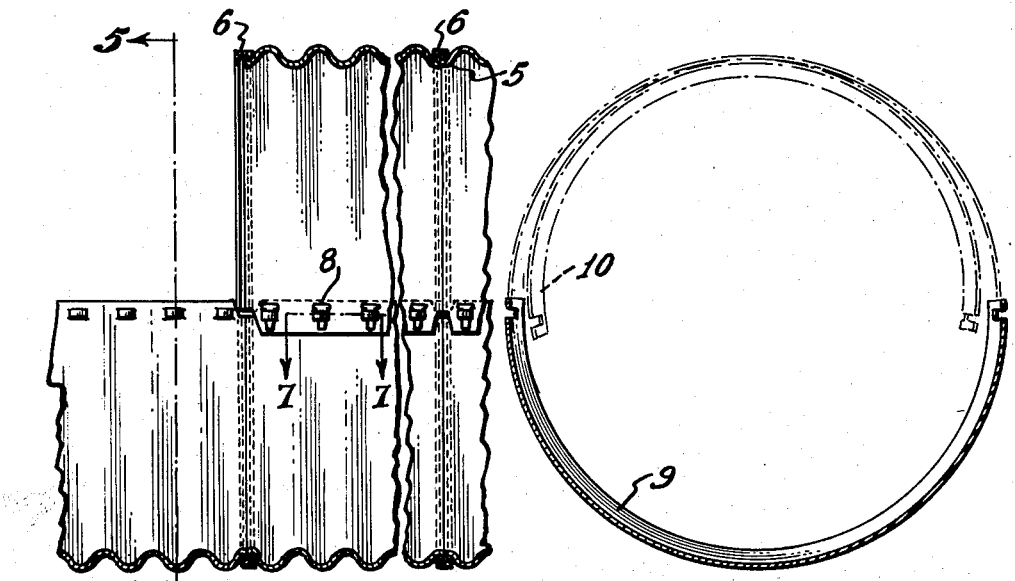
Figure 4 is an enlarged cross-sectional view showing a method of connecting adjacent ring-like sections together.
Figure 7:
Figure 7 is a partial cross-sectional view taken on the line 7, 7 of Figure 4.
Figure 8:
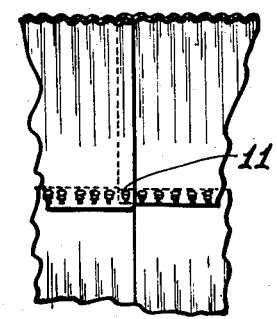
Figure 8 is a detailed perspective view of one of the fastening elements.

When two circumferentially adjacent plate sections are overlapped, the hasp-like elements 7 of one section will nest with the hasp-like elements 7 of the adjacent section. To fasten the adjacent sections together I use a fastening member 8 shown in detail in Figure 8. The fastening member or key 8 is generally of T-shape as shown and is longitudinally tapered to wedge shape. As also shown in Figure 8, this member is curved about its longitudinal axis so as to nest in a valley of the corrugations of the respective plate sections, and to close off completely the opening made by pushing out the hasp-like elements. When two adjacent curved plate sections are overlapped and nested as described above, the key member 8 may be driven into position in the aperture 7a as best shown in Figures 4 and 7. It will be clear that, if desired, I could make the member 8 solid and of a cross section similar to that of the aperture 7a as shown in Figure 7 whereby to fill the aperture 7a completely, but this is not necessary.

For the purpose of enabling a workman to assemble the tunnel liner from within, I prefer to make the hasp-like elements 7 in the valleys of the corrugations as viewed from the inside. In this way, as will clearly appear from Figure 5, a workman having laid a lower section as at 9 can introduce the upper section into the tunnel by slightly bowing it inwardly as shown at 10. As pointed out above if three or more sections are used, it will be unnecessary to bow a section in order to introduce it into the tunnel. It is then a relatively simple matter to push the member 10 outwardly until the hasp-like elements on the members 9 and 10 nest together. The keys 8 can then be readily inserted from within the tunnel.

In the event that a seam of this type is to be used on nestable pipe or pipe assembled in the field it may be preferable to make the hasp-like elements 7 in the valleys as viewed from the outside of the pipe so that the key members 8 may be inserted by workmen on the outside of the pipe. This, of course, would not be a departure from my invention. In this type of construction also it would not be necessary to weld the channel element 6 to each curved plate section prior to assembling, but the elements 6 could be added after the ring sections were assembled and they could be held in position by any suitable type of clamp.

It will be understood that the provision of a welded channel on the flange at the forward end of the construction into which the flange on the rear end of the next forward section is inserted provides a positive joint in that the channel provides an outer boundary for the flange of the next section and as soon as the longitudinal seams are completed the next forward section cannot become smaller in diameter.

In practice I have made a slight modification and in place of the channel I have used T-shaped headed bolts. The T-headed bolt hooked over the two flanges on the outside and with a wide washer on the inside, the two flanges were held rigidly against inward and outward movement, and since the T-head came down over the flanges, end-wise movement was likewise prevented. In practice such bolts may be used every 6 to 12 inches around the periphery.

Figure 9:
Figure 9 is a partial cross-sectional view showing a modification of my invention.

In Figure 9 I have shown a slight modification of the invention in which the ring-like sections are fastened end to end in a somewhat different manner. Here I have eliminated the flange 5 and the channel-like element 6 and instead I have made the line of hasp-like elements 7 non-parallel with the edge of the plate whereby when the circumferentially adjacent curved plate sections are assembled with the hasp-like elements nesting, the ring-like section will have a slight taper so that one end of a ring-like section may be telescoped within the larger end of an adjacent ring-like section. In this case at the point indicated at 11 in Figure 9 there will be four instead of two nesting hasp-like elements. In order to simplify assembly it will be desirable to deform the hasp-like elements 7 at this point to a greater degree than the others in order to secure an aperture 7a of approximately the same size as the other apertures 7a.

It will actually be preferable to stagger the longitudinal seams and not to provide hasps in the overlappings of the corrugations since this would eliminate having four thicknesses of metal.

It will be clear that numerous modifications may be made without departing from the spirit of my invention and that the showing of the drawings is merely by way of example. What I claim as new and desire to secure by Letters Patent is:

1. A light duty corrugated tunnel liner comprising a plurality of ring-like sections fastened together end to end, each section comprising circumferentially at least two curved plates, each plate having loop elements formed in corrugations at each end thereof, the loop elements of two adjacent plates nesting together with said plates in lapped relation circumferentially, and fastening members passing through said nested loop elements to hold said curved plates in assembled relation.

2. A structure according to claim 1, in which said loop elements project inwardly from the valleys of the corrugations of said plates, as viewed from the inside of the liner, whereby said tunnel liner may be assembled from the inside.

3. A light duty corrugated tunnel liner comprising a plurality of ring-like sections fastened together end to end, each section comprising circumferentially at least two curved plates, each plate having loop elements formed in the corrugations at each end thereof, said elements comprising struck out portions of said plates having the curvature of the corrugations reversed to form apertures of bi-convex cross-section, the loop elements of two adjacent plates nesting together with said plates in lapped relation circumferentially, and fastening members passing through said nested loop elements to hold said curved plates in assembled relation.

4. A structure according to claim 3, in which said loop elements project inwardly from the valleys of the corrugations of said plates, as viewed from the inside of the liner, whereby said tunnel liner may be assembled from the inside.

5. A light duty corrugated tunnel liner comprising a plurality of ring-like sections fastened together end to end, each section comprising circumferentially at least two curved plates, each plate having loop elements formed in the corrugations at each end thereof, the lines of said loop elements being non-parallel with the edges of said plates, the loop elements of two adjacent plates nesting together with said plates in lapped relation circumferentially, and fastening members passing through said loop elements to hold said curved plates in assembled relation, said ring-like sections having a taper by virtue of said non-parallelism, and being telescoped end to end.

6. A structure according to claim 1 in which the several curved plates are provided with flanges at each end axially thereof, and means for fastening adjacent flanges together, said fastening means comprising bolt elements disposed between said adjacent flanges and having heads engaging over a pair of adjacent flanges.

GEORGE E. SHAFER.

REFERENCES CITED

The following references are of record in the file of this patent:

UNITED STATES PATENTS

| Number | Name | Date |
|---|---|---|
| 181,297 | Wright | Aug. 22, 1876 |
| 613,053 | Bates | Oct. 25, 1898 |
| 915,086 | Ferguson | Mar. 16, 1909 |
| 934,574 | Schlafly | Sept. 21, 1909 |
| 970,772 | Wold | Sept. 20, 1910 |
| 1,140,362 | Dean | May 25, 1915 |
| 1,208,708 | King | Dec. 12, 1916 |
| 1,232,043 | Kahler | July 3, 1917 |